US012349254B2

(12) United States Patent
Borra et al.

(10) Patent No.: US 12,349,254 B2
(45) Date of Patent: Jul. 1, 2025

(54) DETERMINING A LIGHTING DEVICE WHITE POINT BASED ON A DISPLAY WHITE POINT

(71) Applicant: SIGNIFY HOLDING B.V., Eindhoven (NL)

(72) Inventors: Tobias Borra, Rijswijk (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 24 days.

(21) Appl. No.: 18/273,998

(22) PCT Filed: Jan. 13, 2022

(86) PCT No.: PCT/EP2022/050622
§ 371 (c)(1),
(2) Date: Jul. 25, 2023

(87) PCT Pub. No.: WO2022/157067
PCT Pub. Date: Jul. 28, 2022

(65) Prior Publication Data
US 2024/0414826 A1 Dec. 12, 2024

(30) Foreign Application Priority Data
Jan. 25, 2021 (EP) .................................... 21153202

(51) Int. Cl.
*H05B 47/105* (2020.01)
*H05B 47/19* (2020.01)

(52) U.S. Cl.
CPC ........... *H05B 47/105* (2020.01); *H05B 47/19* (2020.01)

(58) Field of Classification Search
CPC .............................. H05B 47/105; H05B 47/19
See application file for complete search history.

(56) References Cited

U.S. PATENT DOCUMENTS 8,026,908 B2 9/2011 Ku et al.
8,319,723 B2 * 11/2012 Norgaard ................ H04N 5/58 345/169

(Continued)

FOREIGN PATENT DOCUMENTS

WO WO-2005031693 A1 * 4/2005 ............... G09G 3/02
WO 2019076667 A1 4/2019

(Continued)

*Primary Examiner* — Adam D Houston

(57) ABSTRACT

A system (11) for controlling a lighting device (31, 32) to render light effects determined based on an analysis of video content while a display (47) displays the video content is configured to determine a display white point used by the display and determine a lighting device white point to be used by the lighting device based on the display white point. The display displays the video content according to the display white point. The system is further configured to perform the analysis of the video content to determine the light effects and control the lighting device to render the light effects according to the lighting device white point, and either: transmit color information and the lighting device white point to the lighting device to enable the lighting device to convert the color information to light settings according to said lighting device white point, or perform the analysis of said video content by determining colors from said video content, convert said colors to light settings according to the lighting device white point, and transmit light commands comprising said light settings to said lighting device.

12 Claims, 4 Drawing Sheets

(56) References Cited

U.S. PATENT DOCUMENTS

| | | | | |
|---|---|---|---|---|
| 8,503,776 | B2 * | 8/2013 | Kim | G09G 5/02 382/167 |
| 8,970,786 | B2 * | 3/2015 | Li | H05B 47/1985 725/123 |
| 9,330,629 | B2 * | 5/2016 | Cameron | G09G 5/02 |
| 9,386,289 | B2 * | 7/2016 | Tuna | H04N 9/646 |
| 9,986,614 | B2 * | 5/2018 | Verbrugh | H05B 45/20 |
| 10,395,421 | B2 * | 8/2019 | Kunkel | H04N 5/58 |
| 10,477,177 | B2 * | 11/2019 | El-Yamany | H04N 23/71 |
| 10,531,548 | B2 * | 1/2020 | Van De Sluis | H05B 45/20 |
| 10,534,973 | B2 * | 1/2020 | Keene | G06V 10/763 |
| 10,733,371 | B1 * | 8/2020 | Baloga | G06Q 10/101 |
| 10,772,177 | B2 * | 9/2020 | Mason | G06F 3/04847 |
| 2004/0196250 | A1 * | 10/2004 | Mehrotra | H04N 9/73 348/E17.005 |
| 2007/0242162 | A1 | 10/2007 | Gutta et al. | |
| 2009/0123086 | A1 * | 5/2009 | Iwanami | H05B 47/155 382/274 |
| 2010/0110000 | A1 | 5/2010 | De Greef | |
| 2014/0142762 | A1 * | 5/2014 | Li | H04N 21/42202 700/275 |
| 2014/0210802 | A1 * | 7/2014 | Myers | G09G 3/3426 345/207 |
| 2014/0300617 | A1 * | 10/2014 | Cameron | G09G 3/2003 345/589 |
| 2020/0374996 | A1 * | 11/2020 | Barnes | H05B 47/196 |
| 2024/0357719 | A1 * | 10/2024 | Akatsuka | H05B 47/19 |
| 2024/0414826 | A1 * | 12/2024 | Borra | H05B 47/11 |

FOREIGN PATENT DOCUMENTS

| | | | | |
|---|---|---|---|---|
| WO | WO-2019214941 | A1 * | 11/2019 | G06F 3/04845 |
| WO | WO-2022157067 | A1 * | 7/2022 | H05B 47/105 |

* cited by examiner

DETERMINING A LIGHTING DEVICE WHITE POINT BASED ON A DISPLAY WHITE POINT

CROSS-REFERENCE TO PRIOR APPLICATIONS

This application is the U.S. National Phase application under 35 U.S.C. § 371 of International Application No. PCT/EP2022/050622, filed on Jan. 13, 2022, which claims the benefit of European Patent Application No. 21153202.3, filed on Jan. 25, 2021. These applications are hereby incorporated by reference herein.

FIELD OF THE INVENTION

The invention relates to a system for controlling a lighting device to render light effects determined based on an analysis of video content while a display displays said video content.

The invention further relates to a method of controlling a lighting device to render light effects determined based on an analysis of video content while a display displays said video content.

The invention also relates to a computer program product enabling a computer system to perform such a method.

BACKGROUND OF THE INVENTION

Philips' Hue Entertainment and Hue Sync have become very popular among owners of Philips Hue lights. Philips Hue Sync enables the rendering of light effects based on the content that is played on a computer, e.g. video games. A dynamic lighting system can dramatically influence the experience and impression of audio-visual material, especially when the colors sent to the lights match what would be seen in the composed environment around the screen. U.S. Pat. No. 8,026,908 B2 discloses an alternative solution in which only the intensity of surround lights integrated into a display device is changed and the color is kept fixed at the display white point, but this does not have the same effect on the experience and impression of the audio-visual material.

This new use of light can bring the atmosphere of a video game or movie right into the room with the user. For example, gamers can immerse themselves in the ambience of the gaming environment and enjoy the flashes of weapons fire or magic spells and sit in the glow of the force fields as if they were real. Hue Sync works by observing analysis areas of the video content and computing light output parameters that are rendered on Hue lights around the screen. When the entertainment mode is active, the selected lighting devices in a defined entertainment area will play light effects in accordance with the content depending on their positions relative to the screen.

Initially, Hue Sync was only available as an application for PCs. An HDMI module called the Hue Play HDMI Sync Box was later added to the Hue entertainment portfolio. This device addresses one of the main limitations of Hue Sync and aims at streaming and gaming devices connected to the TV. It makes use of the same principle of an entertainment area and the same mechanisms to transport information. This device is in principle a HDMI splitter which is placed between any HDMI device and a TV.

A drawback of current dynamic lighting systems is that the light effects rendered on the lighting devices do not match enough with the elements of the video content displayed on the display device, at least for certain users.

SUMMARY OF THE INVENTION

It is a first object of the invention to provide a system, which can be used to make light effects rendered on entertainment lighting devices better match with elements of video content displayed on a display device.

It is a second object of the invention to provide a method, which can be used to make light effects rendered on entertainment lighting devices better match with elements of video content displayed on a display device.

In a first aspect of the invention, a system for controlling a lighting device to render light effects determined based on an analysis of video content while a display displays said video content comprises at least one output interface and a processor configured to determine a display white point used by said display, said display displaying said video content according to said display white point, determine a lighting device white point to be used by said lighting device based on said display white point, perform said analysis of said video content to determine said light effects, and control, via said at least one output interface, said lighting device to render said light effects according to said lighting device white point. The lighting device will then render said light effects, which comprise multiple different colors over time. In other words, the lighting device is controlled to render a plurality of colors in sequence, each of said colors according to said lighting device white point.

This reduces or removes the potential mismatch between the lighting devices and the display in terms of white point, in particular for users whose display devices use a white point setting other than a default one (e.g. D65). Preferably, the light effects rendered on the lighting devices match as closely as possible elements of the video content displayed on the display device. A potential mismatch in terms of overall brightness and saturation may be reduced or removed in a similar manner. Said lighting device white point may be equal to said display white point, for example. In particular, said lighting device white point may be controlled to be closer to said display white point than a default white point or a current white point of the lighting device. Thus, by controlling said lighting device to render said light effects according to said lighting device white point the user will perceive the colors rendered by the lighting device to be more similar to (the colors of) the video content displayed on the display device.

The likelihood that a non-default white point is used has increased now that many smart devices are capable of changing the display white point setting dynamically. For example, iOS automatically adjusts both brightness and white point as a function of ambient lighting and/or time of day. In other words, said display setting may depend on a time of day and/or on sensor data measured by a light sensor.

When the display is set to a native white point of e.g. 3000K, which is the warmest setting of Apple iOS's Night Shift, it is beneficial to adjust the white point of the lighting devices accordingly, something that currently is not possible. Similar adaptive features are present on Android phones (called "night mode") and in notebook/PC software like f.lux (https://justgetflux.com/).

The likelihood that a non-default white point is used has also increased as a result of display devices allowing users to configure the white point setting. Preferably, the display white point and the lighting device white point are determined on a regular basis, as the display device may change the used white point over time. A static setting of the lighting device white point might work well in one instance but might look suboptimal when the display white point setting changes. The display white point is thus a selection of a plurality of white point according to which the display can render the video content. It may be determined by a user, e.g. using a user interface of the display device, or it may be determined by the display device automatically, e.g. based on time of day and/or sensor data.

Said at least one processor may be configured to obtain a display setting specifying said display white point from a display device comprising said display, for example. Alternatively, said at least one processor may be configured to receive sensor data from a light (color) sensor and determine said display white point from said sensor data, for example. Said light (color) sensor may be embedded in or attached to said lighting device or embedded in or attached to a display device comprising said display. Additionally, the (co-located) sensor(s) may be used to further estimate the brightness of the surroundings and adjust the light effects accordingly.

Said at least one processor maybe configured to control, via said at least one output interface, said light sensor to measure said sensor data while said display is displaying a test image and determine said display white point from said sensor data based on said test image, or to select a subset of said sensor data from said sensor data and determine said display white point from said subset of said sensor data based on said test image, said subset of sensor data being measured while said display is displaying said test image. Said test image may be an image which comprises only pixels with a same color value, for example. Said at least one processor may be configured to control, via said at least one output interface, a display device comprising said display to display said test image.

Said at least one processor may be configured to transmit color information and said lighting device white point to said light device to enable said lighting device to convert said color information to light settings according to said lighting device white point. Alternative or additionally, said at least one processor may be configured to perform said analysis of said video content by determining colors from said video content, convert said colors to light settings according to said lighting device white point, and transmit light commands comprising said light settings to said lighting device.

What information is transmitted by the system to the lighting device may depend on the lighting device. For example, the colors extracted from the video content by the system may be in sRGB color space and a lighting device may use color settings in xy+brightness color space to control its light source(s). If the conversion from sRGB color space to xy+brightness color space takes place in the system, the system does not need to transmit the lighting device white point but only light commands comprising the light settings in xy+brightness color space. If the conversion from sRGB color space to xy+brightness color space takes place in the lighting device, the system needs to transmit the lighting device white point as well as the color information, i.e. the colors determined in sRGB color space. The conversion is normally performed by using a conversion matrix, e.g. a D65 conversion matrix.

In a second aspect of the invention, a method of controlling a lighting device to render light effects determined based on an analysis of video content while a display displays said video content, comprises determining a display white point used by said display, said display displaying said video content according to said display white point, determining a lighting device white point to be used by said lighting device based on said display white point, performing said analysis of said video content to determine said light effects, and controlling said lighting device to render said light effects according to said lighting device white point. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a lighting device to render light effects determined based on an analysis of video content while a display displays said video content.

The executable operations comprise determining a display white point used by said display, said display displaying said video content according to said display white point, determining a lighting device white point to be used by said lighting device based on said display white point, performing said analysis of said video content to determine said light effects, and controlling said lighting device to render said light effects according to said lighting device white point.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
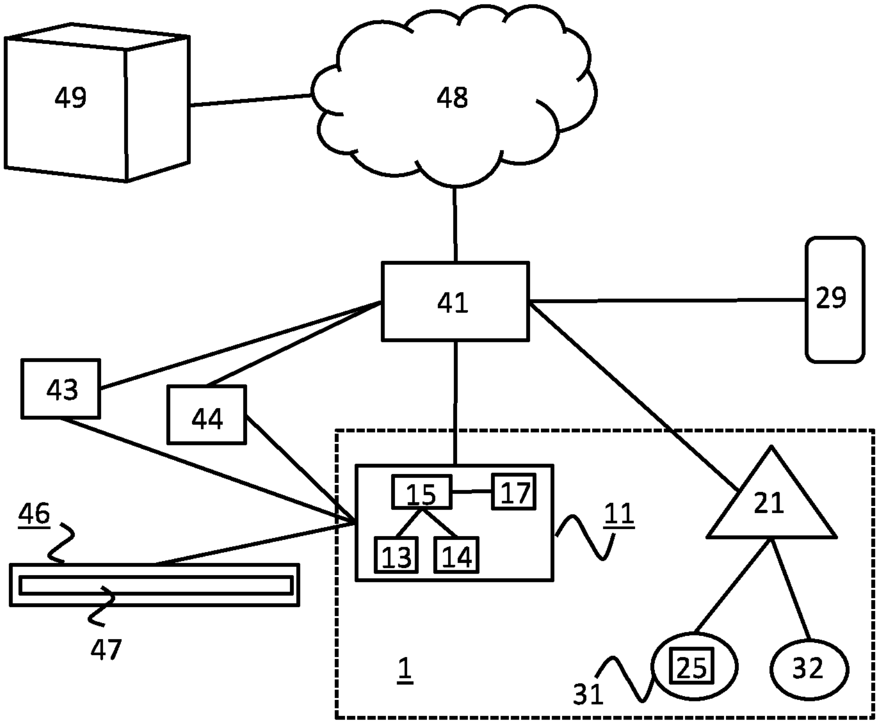
FIG. 1 is a block diagram of an embodiment of the system.

FIG. 1 shows an embodiment of the system for controlling a lighting device to render light effects determined based on an analysis of video content while a display displays the video content. In this embodiment, the system is an HDMI module 11. The HDMI module 11 may be a Hue Play HDMI Sync Box, for example.

In the example of FIG. 1, the HDMI module 11 is part of a lighting system 1. The lighting system 1 further comprises a bridge 21 and two wireless lighting devices 31-32. The bridge 21 may be a Hue bridge and the lighting devices 31-32 may be Hue lamps, for example. In the embodiment of FIG. 1, the HDMI module 11 can control the lighting devices 31-32 via the bridge 21. A mobile device 29 may also be able to control the lighting devices 31-32 via the bridge 21.

The bridge 21 communicates with the lighting devices 31-32 using a wireless communication protocol like e.g. Zigbee. In an alternative embodiment, the HDMI 11 can alternatively or additionally control the lighting devices 31-32 without a bridge, e.g. directly via Bluetooth or via the wireless LAN access point 41. Optionally, the lighting devices 31-32 are controlled via the cloud. The lighting devices 31-32 may be capable of receiving and transmitting Wi-Fi signals, for example.

The HDMI module 11 is connected to a wireless LAN access point 41, e.g. using Wi-Fi. The bridge 21 is also connected to the wireless LAN access point 41, e.g. using Wi-Fi or Ethernet. In the example of FIG. 1, the HDMI module 11 communicates to the bridge 21 via the wireless LAN access point 41, e.g. using Wi-Fi. Alternatively or additionally, the HDMI module 11 may be able to communicate directly with the bridge 21 e.g. using Zigbee, Bluetooth or Wi-Fi technology, or may be able to communicate with the bridge 21 via the Internet/cloud.

The HDMI module 11 is connected to a display device 46, e.g. a TV, and local media receivers 43 and 44 via HDMI. The display device 46 comprises a display 47. The local media receivers 43 and 44 may comprise one or more streaming or content generation devices, e.g. an Apple TV, Microsoft Xbox One and/or Sony PlayStation 4, and/or one or more cable or satellite TV receivers. Each of the local media receivers 43 and 44 may be able to receive content from a media server 49 and/or from a media server in the home network. The local media receivers 43 and 44 provide this content as a video signal to the HDMI module 11 via HDMI. The wireless LAN access point 41 and media server 49 are connected to the Internet 48. Media server 49 may be a server of a video-on-demand service such as Netflix, Amazon Prime Video, Hulu, Disney+ or Apple TV+, for example.

The HDMI module 11 comprises a receiver 13, a transmitter 14, a processor 15, and memory 17. The processor 15 is configured to determine a display white point used by the display 47. The display 47 displays the video content according to the display white point. The processor 15 is further configured to determine a lighting device white point to be used by the lighting devices 31 and 32 based on the display white point, perform the analysis of the video content to determine the light effects, and control, via the transmitter 14, the lighting devices 31 and 32 to render the light effects according to the lighting device white point. A lighting device white point that is equal to the display white point may be used, for example.

In the embodiment of FIG. 1, the processor 15 is configured to obtain a display setting specifying the display white point from the display device 46 and the display device 46 is capable of providing this display setting. Thus, the settings of the display device 46 may be read from the display device itself. For example, some televisions have an interface where certain parameters can be queried, e.g. "jointspace" on (some) Philips televisions (http://jointspace.sourceforge.net/). In iOS, the Hue Sync app could directly communicate with the OS to retrieve information such as current screen brightness, white point, and saturation. The display setting may be user configurable.

In the example of FIG. 1, the display device 46 provides a display setting specifying the display white point to the HDMI module 11. If the display device 46 would not be able to provide this information, it might be possible to use a light sensor instead. In the example of FIG. 1, the lighting device 31 comprises a light sensor 25. In the embodiment of FIG. 1 or in an alternative embodiment, the processor 15 may be configured to receive sensor data from the light sensor 25 and determine the display white point from the sensor data. The sensor data may be transmitted wirelessly to the bridge 21 or directly to the HDMI module 11, either by the lighting device 31 or by the light sensor 25 itself.

In the embodiment of FIG. 1, the processor 15 is configured to perform the analysis of the video content by determining colors from the video content, convert the colors to light settings according to the lighting device white point, and transmit, via the transmitter 14, light commands comprising the light settings to the lighting devices 31 and 32.

In an alternative embodiment, the processor 15 is alternatively or additionally configured to transmit color information and the lighting device white point to the light device to enable a lighting device to convert the color information to light settings according to the lighting device white point, e.g. if the lighting device supports and/or requires this.

What information is transmitted by the system to the lighting device may depend on the lighting device. For example, the colors extracted from the video content by the system may be in sRGB color space and a lighting device may use color settings in xy+brightness color space to control its light source(s). If the conversion from sRGB color space to xy+brightness color space takes place in the system, the system does not need to transmit the lighting device white point but only light commands comprising the light settings in xy+brightness color space. If the conversion from sRGB color space to xy+brightness color space takes place in the lighting device, the system needs to transmit the lighting device white point as well as the color information, i.e. the colors determined in sRGB color space. The conversion is normally performed by using a conversion matrix, e.g. a D65 conversion matrix.

In the embodiment of the HDMI module 11 shown in FIG. 1, the HDMI module 11 comprises one processor 15. In an alternative embodiment, the HDMI module 11 comprises multiple processors. The processor 15 of the HDMI module 11 may be a general-purpose processor, e.g. ARM-based, or an application-specific processor. The processor 15 of the HDMI module 11 may run a Unix-based operating system for example. The memory 17 may comprise one or more memory units. The memory 17 may comprise solid-state memory, for example.

The receiver 13 and the transmitter 14 may use one or more wired or wireless communication technologies such as Wi-Fi to communicate with the wireless LAN access point 41 and HDMI to communicate with the display device 46 and with local media receivers 43 and 44, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 13 and the transmitter 14 are combined into a transceiver.

The HDMI module 11 may comprise other components typical for a consumer electronic device such as a power connector. The invention may be implemented using a computer program running on one or more processors. In the embodiment of FIG. 1, the system is an HDMI module. In an alternative embodiment, the system is a device which comprises the display, e.g. display device 47 or a mobile phone, or a mobile device which does not comprise the display whose white point is determined, e.g. mobile device 29. In the embodiment of FIG. 1, the system comprises a single device. In an alternative embodiment, the system comprises multiple devices.

Figure 2:
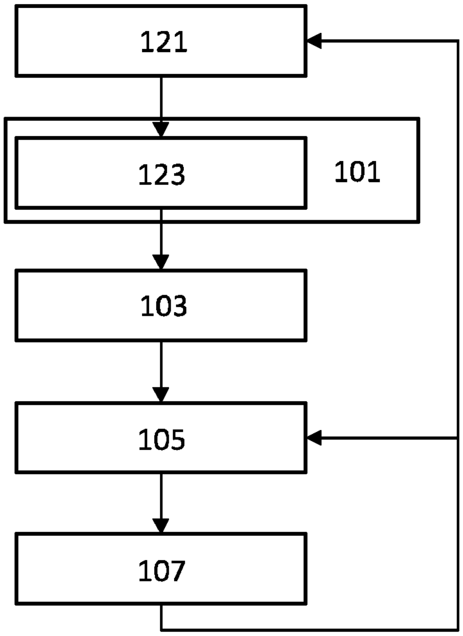
FIG. 2 is a flow diagram of a first embodiment of the method.

A first embodiment of the method of controlling a lighting device to render light effects determined based on an analysis of video content while a display displays the video content is shown in FIG. 2. A step 121 comprises obtaining a display setting specifying a display white point from a display device comprising a display which displays the video content according to the display white point. The display setting may be user configurable. The display setting may depend on a time of day and/or on sensor data measured by a light sensor.

A step 101 comprises determining the display white point used by the display. In the embodiment of FIG. 2, step 101 is implemented by a step 123. Step 123 comprises determining the display white point from the display setting obtained in step 121. The lighting device white point is typically equal to the display white point. A step 103 comprises determining a lighting device white point to be used by the lighting device based on the display white point determined in step 101.

A step 105 comprises performing the analysis of the video content to determine the light effects. A step 107 comprises controlling the lighting device to render the light effects according to the lighting device white point determined in step 103. Step 105 or step 121 may be repeated after step 107, after which the method proceeds as shown in FIG. 2. Since the display white point may be adjusted dynamically, it is beneficial to repeat steps 121, 123, and 103 regularly.

Figure 3:
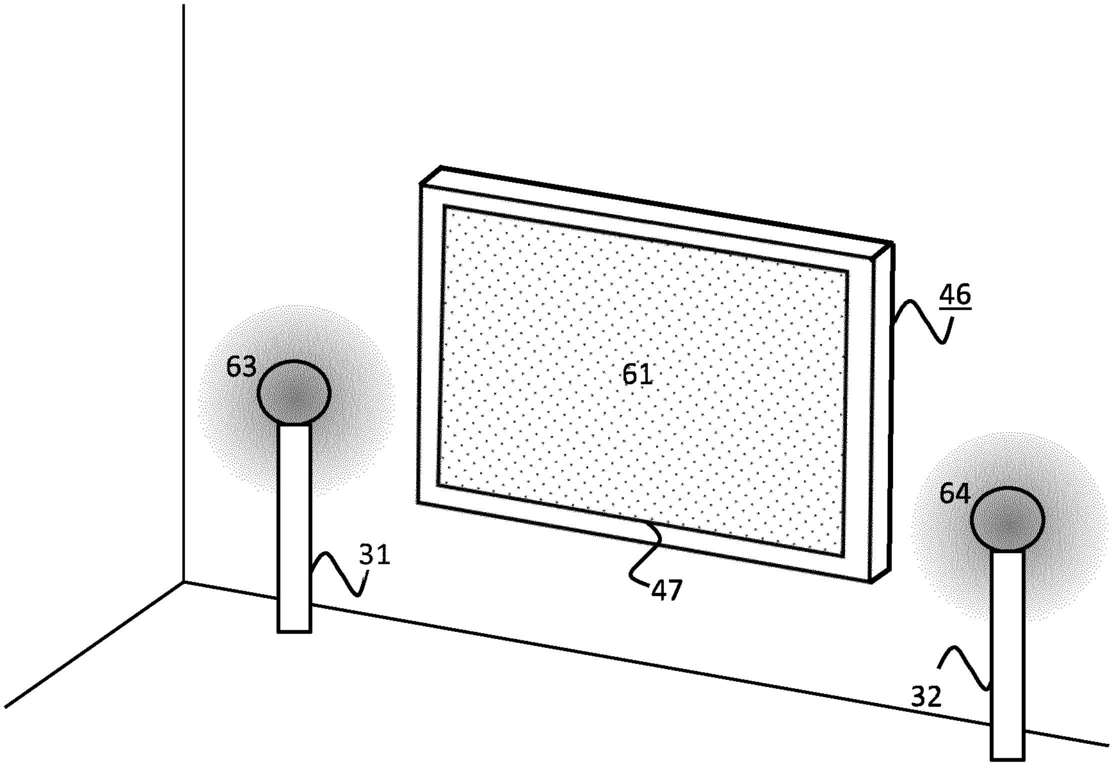
FIG. 3 depicts the display device and lighting devices of FIG. 1.

FIG. 3 depicts the display device 46 and lighting devices 31-32 of FIG. 1. The display 47 of the display device 46 displays video content 61 according to a display white point, which may be user configurable. Lighting devices 31 and 32 are located at both sides of the display device 46 and render light effects 63 and 64, respectively. To make the colors of the light effects 63 and 64 as similar as possible to the colors of the video content 61 as rendered by the display 47, and thereby enhance the experience of the entertainment light effects, the white point used by the lighting devices 31 and 32 is coordinated with the white point used by the display 47.

In the example of FIG. 3, the display device 46 is a stationary display device, e.g. a TV. Alternatively, the display device 46 may be a mobile device, e.g. running Apple's iOS operating system. iOS-based mobile devices typically use a display white point that depends on whether the so-called Night shift mode is active and if the Night shift mode is active, on the current time of day and current geographical location. When the Night shift mode is off, a color temperature of 7448K is used and when the Night shift mode is on, a color temperature of 6395K is used at the coolest setting, a color temperature of 5415K is used at the average setting, and a color temperature of 3026K is used at the warmest setting.

Figure 4:
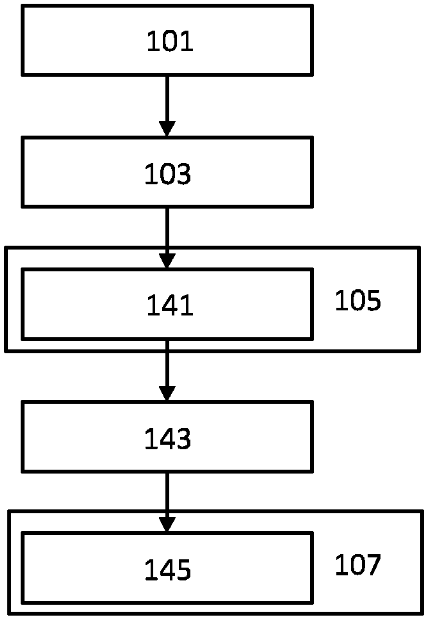
FIG. 4 is a flow diagram of a second embodiment of the method.

A second embodiment of the method of controlling a lighting device to render light effects determined based on an analysis of video content while a display displays the video content is shown in FIG. 4. A step 101 comprises determining the display white point used by the display. The display displays the video content according to the display white point. A step 103 comprises determining a lighting device white point to be used by the lighting device based on the display white point determined in step 101.

A step 105 comprises performing the analysis of the video content to determine the light effects. In the embodiment of FIG. 4, step 105 is implemented by a step 141. Step 141 comprises determining colors from the video content. For example, an average pixel color may be determined for each analysis region of each frame of the video content. A different analysis region may be used for each lighting device. Next, a step 143 comprises converting the colors determined in step 141 to light settings according to the lighting device white point, e.g. using a conversion matrix.

Step 107 comprises controlling the lighting device to render the light effects according to the lighting device white point determined in step 103. In the embodiment of FIG. 4, step 107 is implemented by a step 145. Step 145 comprises transmitting light commands comprising the light settings, obtained in step 143, to the lighting device.

Figure 5:
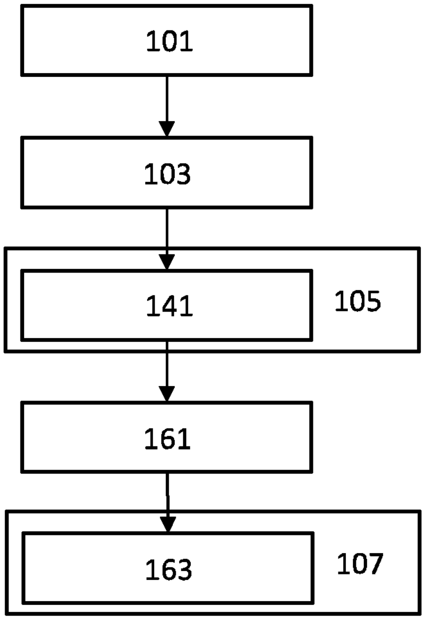
FIG. 5 is a flow diagram of a third embodiment of the method.

A third embodiment of the method of controlling a lighting device to render light effects determined based on an analysis of video content while a display displays the video content is shown in FIG. 5. In the embodiment of FIG. 5, compared to the embodiment of FIG. 4, steps 143 and 145 have been replaced with steps 161 and 163, respectively. In the embodiment of FIG. 5, after the colors have been determined in step 141, step 161 is performed.

Step 161 comprises determining color information based on the colors determined in step 141. For example, the colors determined in step 141 may be included in the color information in a format that the lighting device is able to parse. In an alternative embodiment, the colors are adjusted based on user preferences and the adjusted colors are included in the color information.

Step 163 comprises transmitting the color information determined in step 161 and the lighting device white point determined in step 103 to the light device to enable the lighting device to convert the color information to light settings according to the lighting device white point.

Figure 6:
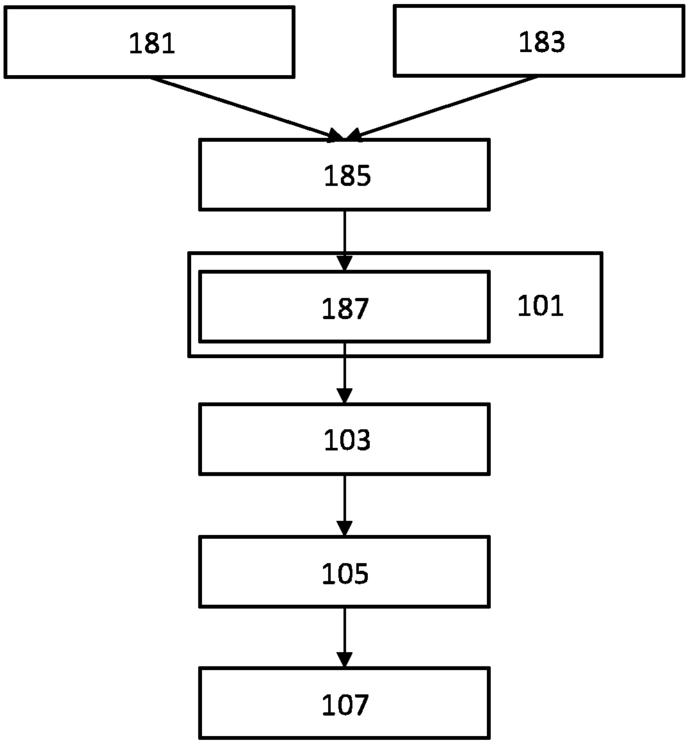
FIG. 6 is a flow diagram of a fourth embodiment of the method.

A fourth embodiment of the method of controlling a lighting device to render light effects determined based on an analysis of video content while a display displays the video content is shown in FIG. 6. A step 181 comprises controlling a display device which comprises the display to display a test image. A step 183 comprises controlling a light sensor to measure sensor data while the display is displaying a test image, e.g. an image comprising only pixels with a same color value. The light sensor may be embedded in or attached to the lighting device or embedded in or attached to the display device.

A step 185 comprises receiving sensor data from the light sensor. A step 101 comprises determining the display white point used by the display. In the embodiment of FIG. 6, step 101 is implemented by a step 187. Step 187 comprises determining the display white point from the sensor data received in step 185 based on the test image, i.e. e.g. by comparing the measured light color with the uniform color value of the test image.

Step 103 comprises determining a lighting device white point to be used by the lighting device based on the display white point determined in step 101. Step 105 comprises performing the analysis of the video content to determine the light effects. Step 107 comprises controlling the lighting device to render the light effects according to the lighting device white point determined in step 103.

Figure 7:
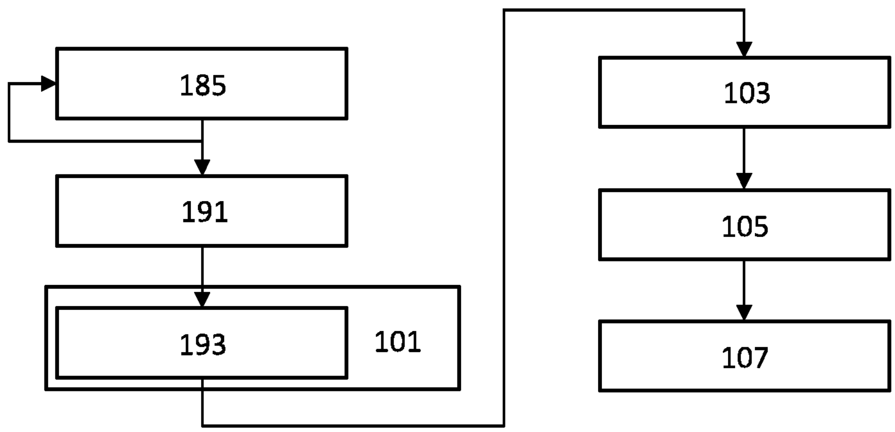
FIG. 7 is a flow diagram of a fifth embodiment of the method.

A fifth embodiment of the method of controlling a lighting device to render light effects determined based on an analysis of video content while a display displays the video content is shown in FIG. 7. Step 185 comprises receiving sensor data from a light sensor. The light sensor may be embedded in or attached to the lighting device or embedded in or attached to a display device comprising the display. In the embodiment of FIG. 7, sensor data is received continuously in step 185, e.g. while the lighting device or display device in which the light sensor is embedded stays turned on.

A step 191 comprises selecting a subset of the sensor data from the sensor data received in step 185. The subset of sensor data is measured while the display is displaying a test image, e.g. an image comprising only pixels with a same color value. Step 101 comprises determining the display white point used by the display. In the embodiment of FIG. 7, step 101 is implemented by a step 193. Step 193 comprises determining the display white point from the subset of the sensor data selected in step 191 based on the test image.

Step 103 comprises determining a lighting device white point to be used by the lighting device based on the display white point determined in step 101. Step 105 comprises performing the analysis of the video content to determine the light effects. Step 107 comprises controlling the lighting device to render the light effects according to the lighting device white point determined in step 103.

The embodiments of FIGS. 2, 4 to 7 differ from each other in multiple aspects, i.e. multiple steps have been added or replaced. In variations on these embodiments, only a subset of these steps is added or replaced and/or one or more steps is omitted. For example, the embodiment of FIG. 4 or FIG. 5 may be combined with the embodiment of FIG. 2, FIG. 6, or FIG. 7 and/or step 181 of FIG. 6 may be included in the embodiment of FIG. 7 or omitted from the embodiment of FIG. 6. Like in the embodiment of FIG. 2, steps 101 and 103 and/or steps 105 to 107 may be repeated regularly in the embodiments of FIGS. 4 to 7.

Figure 8:
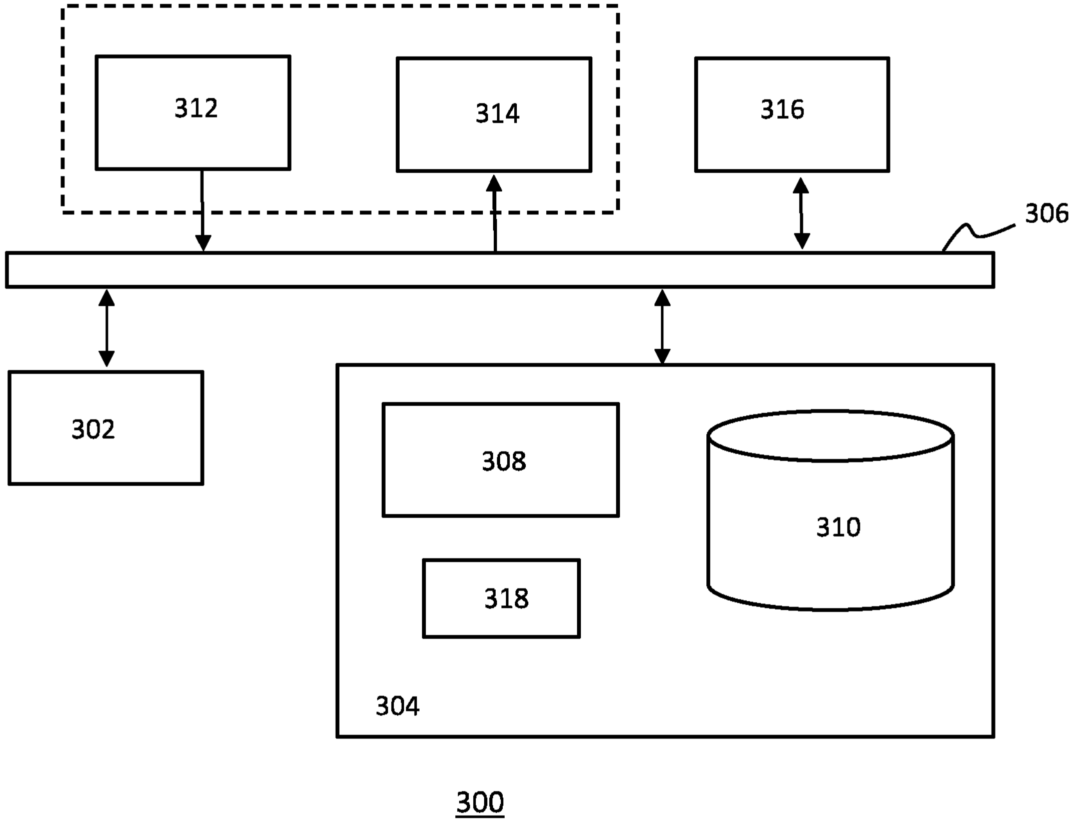
FIG. 8 is a block diagram of an exemplary data processing system for performing the method of the invention.

FIG. 8 depicts a block diagram illustrating an exemplary data processing system that may perform the method as described with reference to FIGS. 2, 4 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting device to render light effects determined based on an analysis of video content while a display displays said video content, said system comprising:

at least one output interface; and a processor configured to:

determine a display white point used by said display, said display displaying said video content according to said display white point, determine a lighting device white point to be used by said lighting device based on said display white point, perform said analysis of said video content to determine said light effects, and control, via said at least one output interface, said lighting device to render said light effects according to said lighting device white point, wherein said at least one processor is configured:

to transmit color information and said lighting device white point to said lighting device to enable said lighting device to convert said color information to light settings according to said lighting device white point, or to perform said analysis of said video content by determining colors from said video content, convert said colors to light settings according to said lighting device white point, and transmit light commands comprising said light settings to said lighting device.

2. A system as claimed in claim 1, wherein said at least one processor is configured to obtain a display setting specifying said display white point from a display device comprising said display.

3. A system as claimed in claim 2, wherein said display setting is user configurable.

4. A system as claimed in claim 2, wherein said display setting depends on a time of day and/or on sensor data measured by a light sensor.

5. A system as claimed in claim 1, wherein said lighting device white point is equal to said display white point.

6. A system as claimed in claim 1, wherein said at least one processor is configured to receive sensor data from a light sensor and determine said display white point from said sensor data.

7. A system as claimed in claim 6, wherein said at least one processor is configured to control, via said at least one output interface, said light sensor to measure said sensor data while said display is displaying a test image and determine said display white point from said sensor data based on said test image, or to select a subset of said sensor data from said sensor data and determine said display white point from said subset of said sensor data based on said test image, said subset of sensor data being measured while said display is displaying said test image.

8. A system as claimed in claim 7, wherein said test image comprises only pixels with a same color value.

9. A system as claimed in claim 7, wherein said at least one processor is configured to control, via said at least one output interface, a display device comprising said display to display said test image.

10. A system as claimed in claim 6, wherein said light sensor is embedded in or attached to said lighting device or embedded in or attached to a display device comprising said display.

11. A method of controlling a lighting device to render light effects determined based on an analysis of video content while a display displays said video content, said method comprising:

determining a display white point used by said display, said display displaying said video content according to said display white point;

determining a lighting device white point to be used by said lighting device based on said display white point;

performing said analysis of said video content to determine said light effects; and controlling said lighting device to render said light effects according to said lighting device white point by:

transmitting color information and said lighting device white point to said lighting device to enable said lighting device to convert said color information to light settings according to said lighting device white point, or performing said analysis of said video content by determining colors from said video content, converting said colors to light settings according to said lighting device white point, and transmitting light commands comprising said light settings to said lighting device.

12. A computer program product for a computing device, the computer program product comprising computer program code to perform the method of claim 1 when the computer program product is run on a processing unit of the computing device.

* * * * *